United States Patent

[11] 3,581,574

[72] Inventor Edwin W. Smith
Climax Township, Kalamazoo County, Mich.
[21] Appl. No. 823,776
[22] Filed May 12, 1969
[45] Patented June 1, 1971
[73] Assignee The Upjohn Company
Kalamazoo, Mich.

[54] SAMPLE SUPPLY APPARATUS
12 Claims, 8 Drawing Figs.

[52] U.S. Cl. 73/423, 74/86, 141/130
[51] Int. Cl. G01n 1/02
[50] Field of Search 73/61.1 C, 64.1, 421; 23/253, 259; 74/86; 141/130

[56] References Cited

UNITED STATES PATENTS

| | | | |
|---|---|---|---|
| 2,604,248 | 7/1952 | Gorham | 141/130 |
| 2,894,542 | 7/1959 | Alm | 141/130 |
| 3,252,327 | 5/1966 | Ferrari | 73/423A |
| 3,301,065 | 1/1967 | Fahrenbach et al. | 73/423A |
| 3,430,495 | 3/1969 | Burge | 73/423A |
| 3,449,959 | 6/1969 | Grimshaw | 73/423A |

*Primary Examiner*—S. Clement Swisher
*Attorneys*—Woodhams, Blanchard & Flynn, Eugene O. Retter and Talivaldis Cepuritis

ABSTRACT: An apparatus for supplying a series of samples to an analyzer, through a tubular element and also for supplying a wash liquid to the tubular element after each of the samples. A radial arm turret having a wash cup upon the end thereof is provided with a drive for rotating the arm through a plurality of stations. A sample carrier is rotatably mounted on the arm and has a plurality of index positions each holding a sample cup with respect to said arm. Gear means between the arm and carrier causes the carrier to rotate a predetermined amount each time the arm rotates 360°, thereby advancing the carrier one index position during each rotation of the turret. The carrier orbits around the rotational axis of the arm so that the carrier is moved toward and away from at least one of the plurality of said stations whereby a series of points on the carrier and one point on the arm can sequentially and alternately occupy the same station during continued rotary movement of said turret. Means are provided for advancing the turret and carrier alternately toward the tubular element so that the sample and wash liquid may be supplied therethrough.

PATENTED JUN 1 1971

INVENTOR.
EDWIN W. SMITH

BY
Woodhams, Blanchard & Flynn
ATTORNEYS

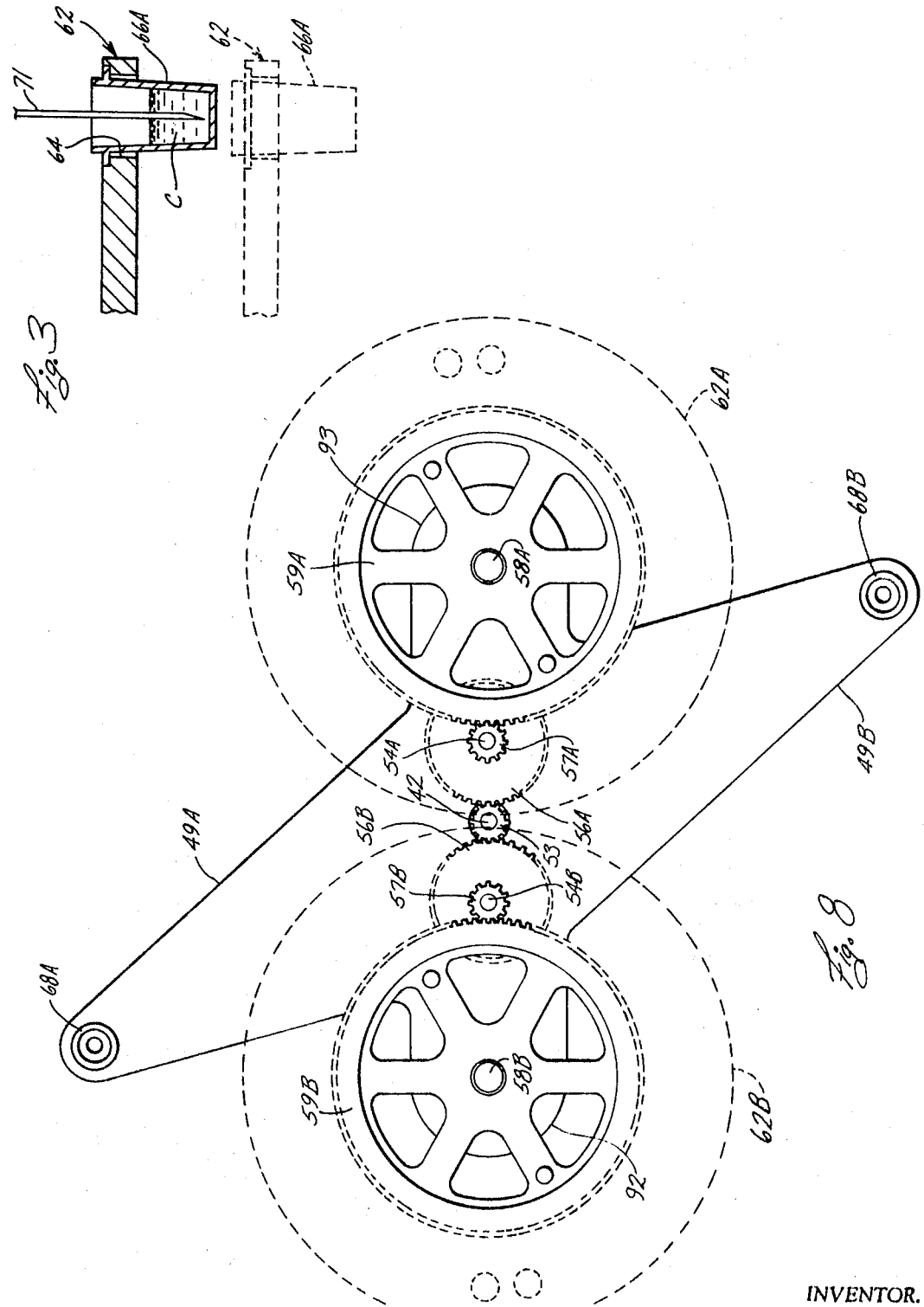

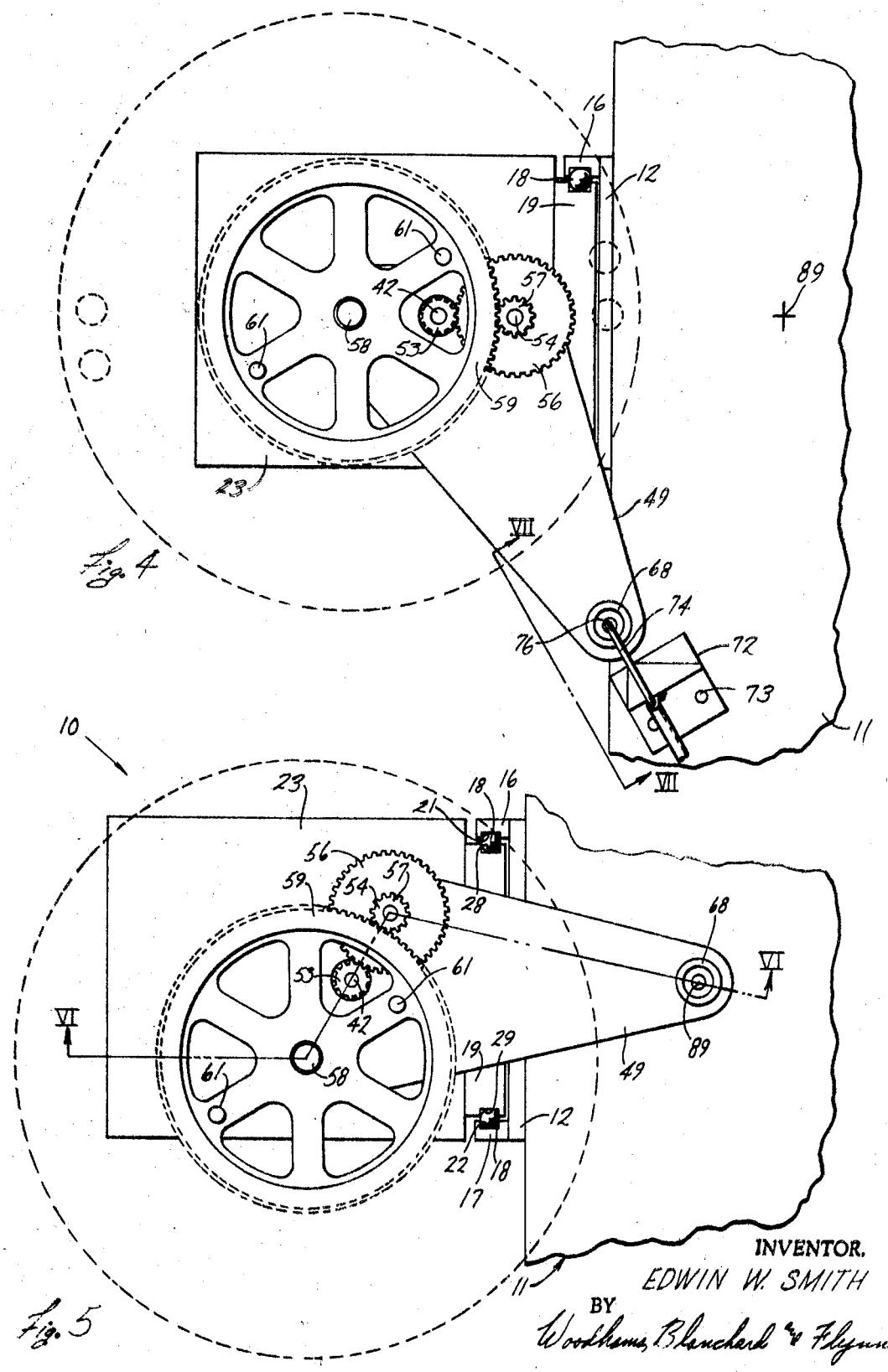

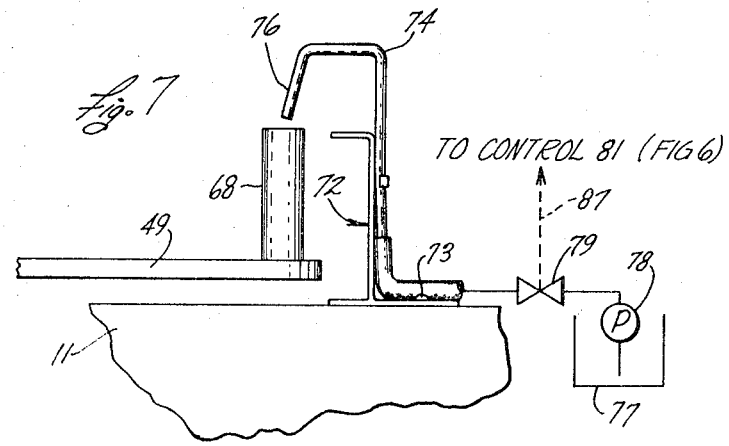
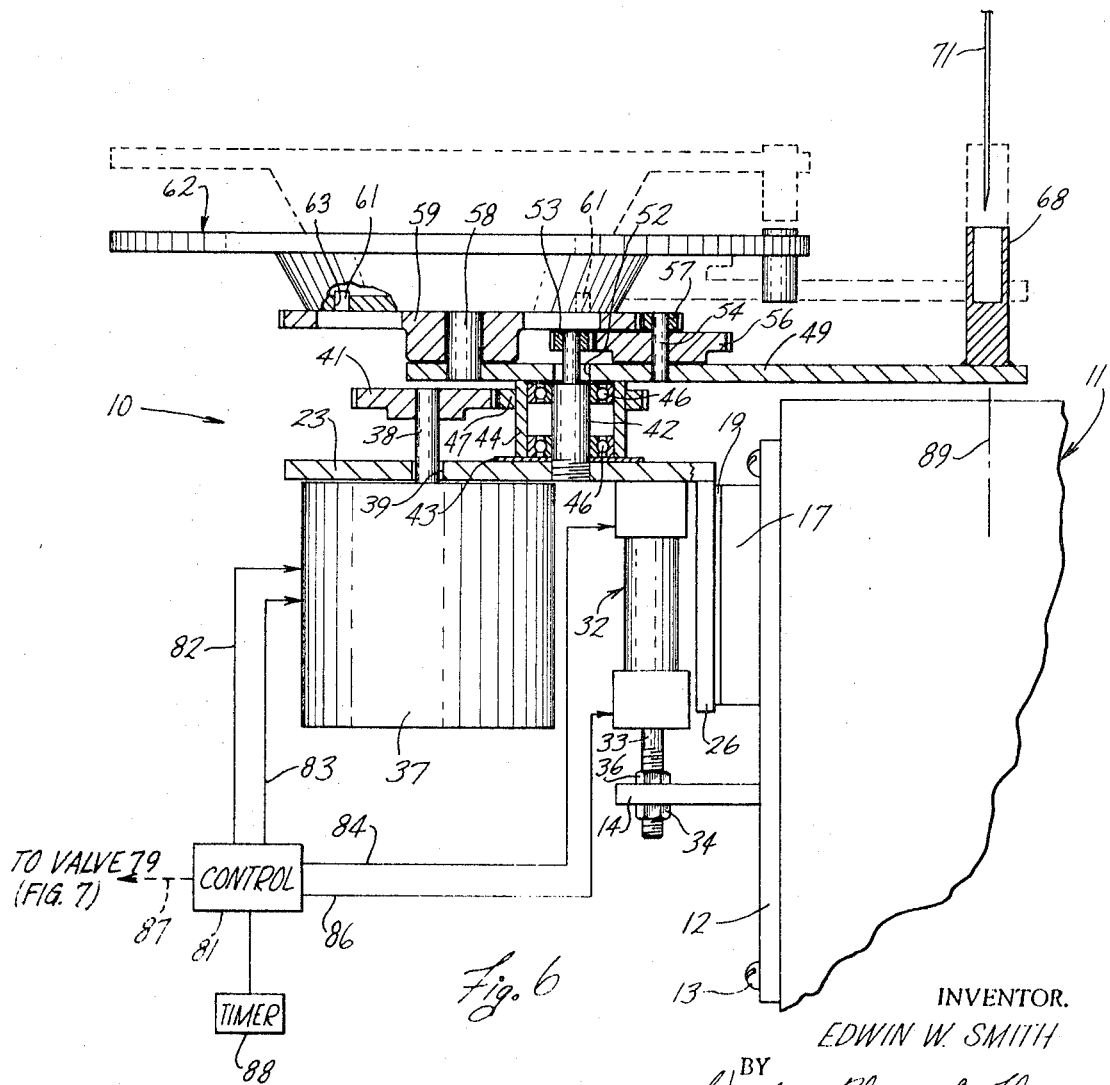

3,581,574

SAMPLE SUPPLY APPARATUS

FIELD OF THE INVENTION

This invention relates to a rotary indexing mechanism and, more particularly, to a type thereof for intermittently and repeatedly rotating one member through a plurality of stations while spaced points on another member are sequentially moved into and out of coincident relationship with one of said stations, the one member being indexed with respect to the other member between appearances of said one member at said one station.

BACKGROUND OF THE INVENTION

This invention developed from a need for presenting, automatically and intermittently, plural quantities of serum and washing solution to a probe, which withdraws the serum from a container and deposits it into test equipment such as a serum analyzer. Before the probe can be used for another test sample of serum, the probe must be flushed and thereby cleaned with a sterile liquid. Previous mechanisms intended for this purpose are complicated to build, difficult to maintain and not always reliable in performance.

Therefore, it is a primary object of this invention to provide a rotary index mechanism to deliver sequentially plural fluid samples to a probe, each such delivery being followed by the washing of the probe. Simultaneously, the carrier for the fluid samples is indexed so that a new fluid sample is delivered to the probe after every delivery of the washing fluid, but without requiring a separate source of cleaning fluid for each sample.

A further object of this invention is the provision of a rotary index mechanism in which fluid samples are supported on a carrier which is moved toward and away from a point where said samples are presented one after another following each movement of the carrier.

It is a further object of this invention to provide a rotary index mechanism, as aforesaid, which may be inexpensively manufactured and easily maintained.

It is a further object of this invention to provide a rotary index mechanism as aforesaid, in which the carrier containing fluid samples can be easily removed from the remainder of the index mechanism and replaced with a new carrier containing a fresh set of fluid samples without adjusting the alignment of the carrier or the fluid samples with respect to the probe.

Other objects and purposes of this invention will be apparent to persons acquainted with mechanisms of this general type upon reading the following specification and inspecting the accompanying drawings, in which:

FIG. 3 is a sectional view substantially as taken along the line III—III in FIG. 2;

FIG. 4 is a top view of the rotary index mechanism in a second position of operation;

FIG. 5 is a top view of the rotary index mechanism in a third position of operation;

FIG. 6 is a sectional view taken along the line VI—VI of FIG. 5;

FIG. 7 is an elevational view as seen along the line VII—VII of FIG. 4; and

FIG. 8 is a partially broken line view of a modified gear chain and turret arm for use in index mechanism.

Figure 1:
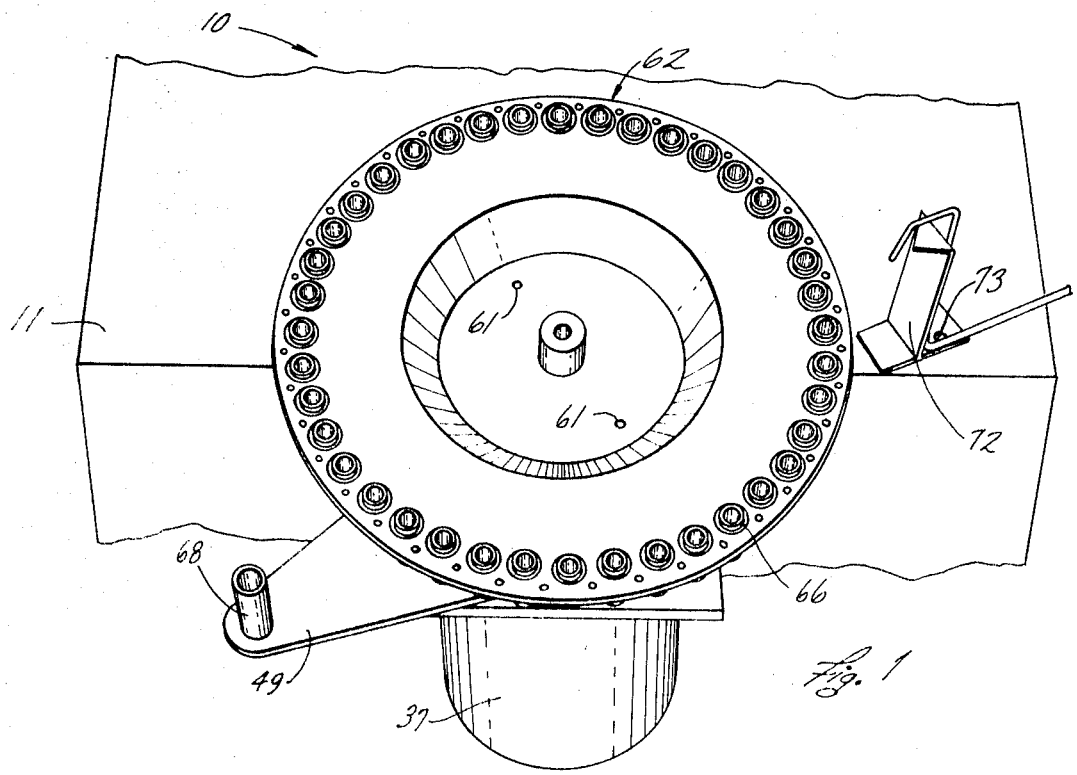
FIG. 1 is a perspective view of the rotary index mechanism embodying the invention.

For convenience in description, the words "up," "down," "right" and "left" will designate directions in the drawings to which reference is made. The words "in" and "out" will refer to directions toward and away from, respectively, the geometric center of the mechanism and designated parts thereof. Such terminology will include derivatives and words of similar import.

SUMMARY OF THE INVENTION

The objects and purposes of the invention are met by providing a turret having an arm rotated through a plurality of stations. A carrier is rotatably mounted on the arm and has a plurality of indexed positions relative to the arm. Drive means rotates the arm and the carrier so that a plurality of spaced points on said carrier and a point on said arm are sequentially moved into and out of one of said stations. Means on the turret advances the carrier one index position during each 360° rotation of the arm. The carrier is mounted on the arm so that the carrier is moved toward and away from said one station during each rotation of said arm.

DETAILED DESCRIPTION

A rotary index mechanism 10 (FIG. 1) embodying the invention may be mounted on a cabinet structure 11 by means including a mounting plate 12 (FIG. 6) secured to the cabinet structure 11 by screws 13. A bracket 14 is secured to the mounting plate 12 and projects outwardly therefrom. A pair of spaced guides 16 and 17 (FIG. 5) are secured to the mounting plate 12 above the plate 14 and extend upwardly therefrom. The opposing surfaces of the guides 16 and 17 are provided with elongated races 21 and 22, respectively, in which plural bearing balls 18 are disposed. A slide 19 is disposed between the guides 16 and 17, and it has a pair of elongated races 28 and 29 on the side surfaces thereof which oppose the races 21 and 22, respectively, on the guides 16 and 17. The bearing balls 18 also extend into the races 28 and 29.

A support table 23 (FIG. 6) is secured to and extends horizontally from a vertical plate 26, which is secured to the slide 19.

A power cylinder 32 is secured to the underside of the table 23 and extends downwardly therefrom. The rod 33 of the power cylinder 32 is threaded at its lower end and received through an opening (not shown) in the bracket 14 where it is secured against movement by the nuts 34 and 36 positioned on opposite sides of the bracket 14.

A drive motor 37 is secured to the underside of the horizontal table 23 and the shaft 38 thereof extends upwardly through an opening 39 in the table 23 and has a drive gear 41 secured thereto.

A stub shaft 42 is secured to the horizontal table 23 and extends upwardly therefrom. A thrust-bearing plate 43 encircles the stub shaft 42 and rests on the upper surface of the table 23. A sleeve 44, which is telescoped over the stub shaft 42 and slideably rests on the thrust-bearing plate 43, is separated from the stub shaft 42 by bearings 46. A gear 47 is secured to the periphery of the sleeve 44 near its upper end and is in meshing engagement with the drive gear 41.

A turret arm or member 49 is secured to the upper end of the sleeve 44 and is rotatable therewith around the axis of the stub shaft 42. The upper end of the stub shaft 42 extends through an opening 52 in the turret arm 49 and has a small gear 53 secured thereto.

A stub shaft 54 is secured to the turret arm 49 and extends upwardly therefrom. A gear 56 is rotatably mounted on the stub shaft 54 and is in meshing engagement with the gear 53 on the stub shaft 42. A gear 57 is coaxially secured to the upper surface of the gear 56 and is rotatable therewith about the axis of the stub shaft 54.

A stub shaft 58 (FIG. 6) is secured to the turret arm 49 and extends upwardly therefrom. In this particular embodiment, the axis of the stub shafts 58 and 54 are on diametrically opposite sides of the shaft 42. A gear 59 is rotatably mounted on the stub shaft 58 and is in meshing engagement with the gear 57. A pair of pins 61 are secured to and extend upwardly from the gear 59 as illustrated in FIGS. 5 and 6.

A carrier 62 (FIGS. 1 and 6) is mounted on the upper surface of the gear 59 and has openings 63 (FIG. 6) into which the pins 61 are received to position properly the gear 59 and the carrier 62 relative to each other. The carrier 62 has a plurality of openings 64 (FIG. 1) therein adjacent to the periphery thereof which receive and position a plurality of small cups 66 adapted to hold fluid samples.

The turret member 49 (FIGS. 1 and 6) extends radially beyond the peripheral edge of the carrier 62, and a wash cup 68 is secured to and extends upwardly from the outer end of said member 49. The wash cup 68, which holds a washing solution, is movable with the turret member 49 along a circular path concentric with the axis of the stub shaft 42 whereby the wash cup 68 is moved into and out of a station below and aligned with a probe 71 illustrated in FIG. 6.

A bracket 72 (FIGS. 1 and 7) is secured upon the upper surface of the cabinet structure 11 by a pair of screws 73 and extends upwardly therefrom. A tubular element 74 is clamped to the bracket 72 and has a nozzle portion 76 which extends over and is directed downwardly toward the circular path followed by the wash cup 68 on the outer end of the arm 49. The tubular element 74 is supplied with a washing solution from a reservoir 77 through a pump 78 and valve 79 operated by a control 81 schematically illustrated in FIG. 7. The control 81 may be of any convenient type having switch means responsive to movement of the arm 49 whereby the valve 79 is opened and closed as a function of the position of the turret member 49. The valve 79 is connected to control 81 by line 87. The control 81 also governs the energization of the motor 37 through lines 82 and 83, schematically illustrated in FIG. 6. The control 81 further governs the energization of the cylinder 32 through fluid lines 84 and 86.

In response to the movement or the position of the turret member 49, a signal will be sent to the control 81 whereby pressure fluid passes through the lines 84 and 86 to either extend the rod 33 and thereby raise the support table 23, or retract the rod 33 and lower the table 23 and carrier 62.

Other signals received by the control 81, including those from a timer 88, will be sent through the line 87 to the valve 79 (FIG. 7) to control the amount of washing solution delivered through the tubular element 74 and nozzle 76 to the wash cup 68. It is also contemplated that the control 81 will effect the energization and deenergization of the motor 37 through the lines 82 and 83 to advance the turret member 49 to the next station.

In this particular embodiment, the carrier 62 (FIG. 1) is illustrated as holding 40 sample cups 66, but carriers capable of carrying more or less cups can also be used. The gear train comprising the gears 53, 56, 57 and 59 (FIG. 2) are of such size and shape that, during each rotation of the arm 49, the carrier 62 will rotate one-fortieth of a 360° revolution with respect to the turret arm 49. More particularly, and in one successful embodiment, the gears have the following number of teeth thereon:
0001

| Gear Number: | Number of teeth |
| --- | --- |
| 53 | 12 |
| 56 | 48 |
| 57 | 12 |
| 59 | 120 |

Accordingly, during each 360° rotation of the arm 49, the carrier rotates 9° and resolves 360°. Due to the specific gear chain disclosed above, the rotation of the carrier is in the reverse direction as compared to the rotation of the arm 49.

OPERATION

Although the operation of the mechanism described above will be understood from the foregoing description by skilled persons, a summary of such description is now given for convenience.

The turret member 49 is rotated by the drive motor 37 acting through the gears 41 and 47. It will be assumed, for purposes of discussion, that the rotary index mechanism 10 is in the position illustrated in FIG. 2 at the beginning of a cycle of operation. In this position, one of the sample cups 66A is directly below and aligned with the probe 71. If the control is now energized, it will pass fluid to the power cylinder 32 so that the support table 23, turret member 49 and carrier 62 are elevated whereby the probe 71 will be received into the sample cup 66A, as is illustrated in FIG. 3. Control circuitry (not shown) may be energized by the raising of table 23 so that the liquid C in the sample cup 66A is withdrawn into the probe 71 and delivered to test apparatus not illustrated.

At the completion of a predetermined amount of time, determined by the timer 88, necessary for the probe 71 to remove the liquid C from the sample cup 66A, the control 81 will then initiate a signal to energize the power cylinder 32 and retract the rod 33 to lower the support table 23, turret member 49 and carrier 62 to their lowered positions illustrated in broken lines in FIG. 3. At the completion of this movement, the control 81 will initiate a signal to energize the motor 37 through the lines 82 and 83 whereby the drive gear 41 will rotate the gear 47 and turret member 49, 180° around the axis of the stub shaft 42, where the wash cup 68 is positioned beneath the nozzle 76 on the tubular element 74 (FIG. 4) and the motor 37 will be deenergized. A signal sent through the line 87 opens the valve 79 to permit the flow of a predetermined quantity of washing solution from the reservoir 77 through the pump 78, the valve 79 and the nozzle 76 into the wash cup 68.

At the completion of the cup-filling operation, the control 81 will energize the motor 37 to cause the turret member 49 to be rotated 60° about the axis of the stub shaft 42 to the position illustrated in FIG. 5 wherein the wash cup 68 is directly below and aligned with the probe 71. The motor 37 is deenergized and pressure fluid is sent from the control 81 through the lines 84 and 86 to actuate the power cylinder 32 and extend the rod 33 to effect a vertical movement of the support table 23, turret member 49 and carrier 62 to the dotted-line position illustrated in FIG. 6 so that the probe 71 is received into the cup 68. At the completion of the vertical stroke by the power cylinder 32, circuitry (not illustrated) may be energized to effect a withdrawal of the washing solution from the cup 68 through the probe 71, thereby purging the probe 71 and conduits connected thereto of any residual of the fluid sample previously withdrawn by the probe.

After a predetermined amount of time, as determined by the timer 88, the control 81 will again pass pressure fluid through the lines 84 and 86 to retract the rod 33 and thereby return the support table 23, turret member 49 and carrier 62 back to their lowered, solid line positions in FIG. 6. After completion of the lowering stroke, the control 81 will energize the motor 37 to rotate the turret member 49, 120° and back to the starting position illustrated in FIGS. 1 and 2.

Simultaneously with the foregoing steps of advancing the turret member 49 in a circular path about the axis of the stub shaft 42, the rotary movement of the turret member 49 will effect orbital movement of the stub shaft 54 around the stub shaft 42 and the gear 53. As a result, the gears 56 and 57 will be rotated relative to the stub shaft 54 to effect rotation of the gear 59, hence the carrier 62, about the stub shaft 58. In this particular embodiment, and utilizing the gears defined above, one complete revolution of the turret member 49 will cause the gears 56 and 57 to rotate one-fourth of a revolution. Since, in this particular embodiment, the gear 57 has 12 teeth, one-fourth of a revolution thereof will effect a rotary movement of the gear 59 through three teeth of its 120 teeth, or one-fortieth of a revolution relative to the turret member 49. Thus, at the completion of the above-described revolution of the turret member 49, the next sample cup 66B (FIG. 2) will be moved to a position directly below and aligned with the probe 71. However, since the carrier 62 rotates with the turret member, the carrier actually rotates one and one-fortieth revolution relative to the cabinet structure 11.

Figure 2:
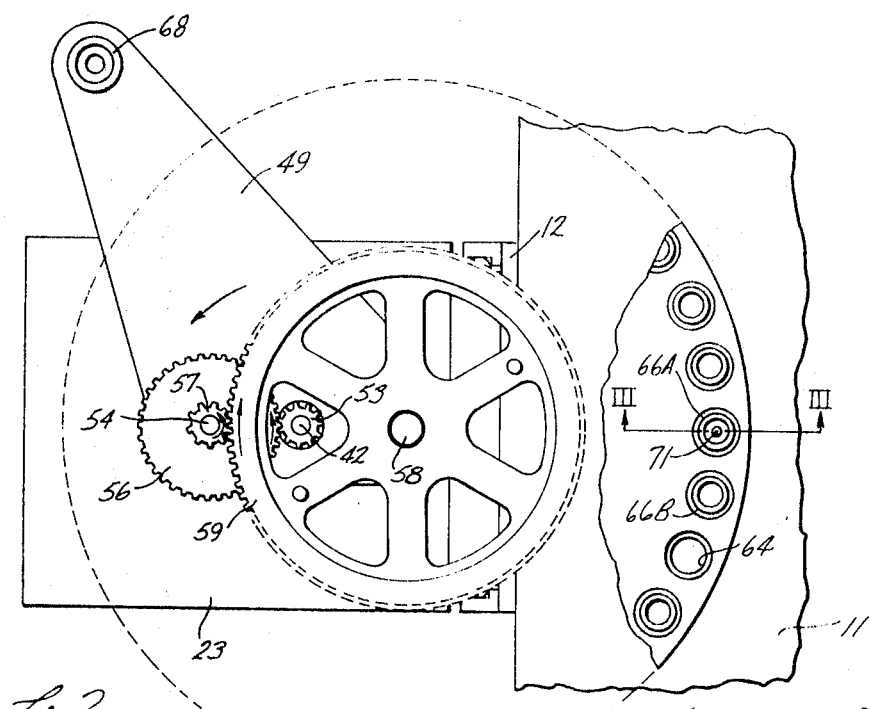
FIG. 2 is a top view of the rotary index mechanism in a first position of operation and with the carrier illustrated in broken lines.

It is important to note that, during the aforedescribed movement, the carrier 62 is moved from the position illustrated in FIG. 2, wherein one of the sample cups 66A is beneath the probe 71, to the position illustrated in FIG. 4 wherein the carrier 62 is at its remotest position from the probe 71 the position of probe 71 being indicated by point 89. Thus, the probe 71 can be caused to discharge the fluid sample into analytical or test equipment located within the cabinet structure 11, without interference from the arm 49 or carrier 62. Such equipment may be a gas chromatograph, for example.

As shown in FIG. 2, the stub shaft 42 is located between the stub shaft 54 and the stub shaft 58. However, the gear 59 could be placed upon the diametrically opposite side of the gear 57 and rotatably supported by a stub shaft mounted upon a leftward extension of the arm 49. This arrangement is shown in FIG. 8 by the locations of the gears 56B and 59B with respect to the gear 53. That is, the stub shaft 42 and the gear 53 in FIG. 8 remain in the same positions relative to the expanded arm 49A as they do in FIG. 2 relative to the arm 49. However, the arm 49A has an extension 92 which supports the stub shaft 58B for rotatably supporting the gear 59B. The shaft 54B and the gears 56B and 57B remain the same as their corresponding parts 54, 56 and 57 in FIG. 2.

In addition to the foregoing, another set of gears 56A, 57A and 59A are mounted upon shafts 54A and 58A, respectively, in a manner identical to the arrangement and support of the gears 56B, 57B and 59B, just described. The arm 49A has an extension 93 to support the shaft 58A. Accordingly, a pair of carriers 62A and 62B can be supported upon the gears 59A and 59B, respectively, for sequential movement into and out of a position beneath a probe. Each carrier will be indexed one position, as described above with respect to the carrier 62, during each 360° rotation of the arm 49A around the axis of the shaft 42.

This double-carrier arrangement would be particularly well suited to circumstances where each test sample must be promptly compared with a standard. The carrier 62A could support containers holding samples of a standard fluid, for example, and carrier 62B could carry containers holding the fluid test samples. Under these circumstances, it would be advantageous to provide a second arm 49B which is on the diametrically opposite side of the shaft 42 from arm 49A for the purpose of carrying another wash cup 68B similar to the cup 68A. This would permit purging or flushing of the probe after each sample is taken. The arms 49A and 49B are somewhat longer than the arm 49 in order to place their cups 68A and 68B beneath the probe. This is required by the fact that the gears 59A and 59B are remote from gear 53 rather than overlapping it, as shown in FIG. 2 with respect to gear 59.

It will be seen from the foregoing that many variations in gear chain arrangements can be provided to produce different results. For example, by moving the gear 59A away from direct engagement with the gear 57A and then placing an idler gear in meshing engagement with both of the gears 57A and 59A, the carriers 62A and 62B can be caused to rotate in opposite rotational directions. Furthermore, the shafts 58A and 58B could be moved closer to each other while remaining at the same distances from the shaft 42 and maintaining their engagement with the gears 57A and 57B, respectively. Then, by raising one or the other of the gears 59A and 59B, the carriers 62A and 62B could be overlapped to conserve space or to facilitate their use.

Although a particular preferred embodiment of the invention has been disclosed in detail for illustrative purposes, it will be recognized that variations and modifications of the disclosed apparatus, including the rearrangement of parts, lie within the scope of the present invention.

The embodiments of the invention in which an exclusive property or privilege I claim are defined as follows:

1. A rotary mechanism, comprising:
   arm means supported for rotation around an upright axis, a point on said arm being moved through a plurality of stations;
   carrier means mounted on said arm means for rotation with respect to said arm means around an upright axis, said carrier means having a plurality of locations thereon movable into and out of one of said stations, said locations being occupied by removable receptacles uniformly positioned along a circle concentric with the rotational axis of said carrier means;
   upright cup means supported on said arm means at said point, said receptacles being moved sequentially into and out of said one station and said cup means being moved into and out of said station following each receptacle;
   drive means for rotating said arm means;
   control means governing the operation of said drive means; and
   linkage means on said arm means rotating said carrier means in response to rotation of said arm means, the angular displacement of said carrier means being different than the angular displacement of said arm means.

2. A rotary mechanism, comprising:
   arm means supported for rotation around an upright axis, cup means on said arm means being moved through a plurality of stations;
   carrier means rotatably mounted on said arm means and adapted to revolve around said upright axis, said carrier means having a plurality of receptacles thereon movable into and out of one of said sections;
   drive means for rotating said arm means;
   control means governing the operation of said drive means; and
   linkage means on said arm means rotating and revolving said carrier means in response to rotation of said arm means, the angular displacement of said carrier means being different than the angular displacement of said arm means.

3. A rotary mechanism according to claim 1, including a second rotatable carrier means mounted on said arm means and adapted to revolve around an upright axis, said second carrier means having a plurality of receptacles thereon movable into and out of said one of said stations, the axes of rotation of the first-mentioned carrier means and said second carrier means being spaced and parallel; and
   second linkage means on said arm means rotating and revolving said second carrier means in response to rotation of said arm means, the angular displacement of said second carrier means being different than the angular displacement of said arm means.

4. A rotary mechanism according to claim 1, wherein the angular displacement in degrees of said arm means is an even multiple of the angular displacement in degrees of said carrier means during each 360° revolution of said arm means.

5. A rotary mechanism according to claim 1, wherein said arm means rotates around a first upright axis and said carrier means rotates around a second upright axis spaced from said first axis, said cup means on said arm means being spaced radially from said first axis a distance greater than the radial distance between said second axis and the receptacles on said carrier means.

6. A rotary mechanism according to claim 1, including:
   base means;
   table means supported upon said base means for substantially vertical movement with respect thereto, said arm means being rotatably supported upon said table means; and
   fluid-actuated means connected between table means and said base means for effecting said vertical movement of said table means, said fluid-actuated means being operated by said control means.

7. A rotary mechanism according to claim 1, wherein the rotation of said arm means is stopped when said cup means is positioned in three spaced stations around said rotational axis of said arm means, said cup means on said arm means being in said one station when said carrier means is substantially remote from said one station, and said cup means being in the second one of said three stations when one of the receptacles on said carrier means is at said one station.

8. A rotary mechanism according to claim 7, wherein said one station is spaced from the other two stations by 180° and 60°, respectively; and including bracket means mounted adjacent the third one of said stations and conduit means counted upon said bracket means and directed at said cup means on said arm means when said cup means is in said third station;

a source of washing liquid, said conduit means being connected to said source; and valve means in said conduit means and connected to said control means for controlling the discharge of said liquid.

9. A rotary mechanism for intermittently and sequentially presenting a plurality of receptacles, comprising:

base means;

table means movably supported upon said base means for substantially vertical movement;

actuating means connected between said base means and said table means for effecting said vertical movement;

drive means supported on said table means;

turret means supported on said table means and connected to said drive means, said turret means having arm means rotatable about a first upright axis and carrier support means mounted upon said arm means for rotation around a second upright axis and revolution around said first upright axis;

gear means supported on said arm means and effecting rotation and revolution of said carrier support means in response to rotation of said arm means, said carrier support means rotating a predetermined amount of degrees evenly divisible into 360° with each 360°-rotation of said arm means; and control means for synchronizing the operation of said actuating means and said drive means, said arm means having cup means intermittently moved into and out of a plurality of stations.

10. A rotary mechanism according to claim 9, wherein said cup means is in one station when said carrier support means is substantially remote from said one station; and wherein said table means and said turret means are raised and then lowered by said actuating means when said cup means is in said one station.

11. A rotary mechanism according to claim 9, including annular carrier means supported upon said carrier support means in a predetermined position with respect thereto and concentric with said second axis, said carrier means having a plurality of uniformly spaced receptacle positions arranged along the edge of said carrier means, said receptacle positions defining a circle concentric with said second axis and being moved intermittently and sequentially into and out of said one station, one receptacle position being moved into said one station during each rotation of said arm means.

12. A rotary mechanism, comprising:

arm means supported for rotation around an upright axis, a point on said arm being moved through a plurality of stations;

an annular member mounted on said arm means for rotation with respect to said arm means around an upright axis, said annular member having a plurality of receptacles thereon movable into and out of one of said stations;

drive means for rotating said arm means, said drive means comprising a motor and first gear means connecting said motor to said arm means;

control means governing the operation of said drive means; and second gear means on said arm means connected between said first gear means and said annular member for rotating said annular member in response to rotation of said arm means, said annular member being removably supported by said second gear means and having a plurality of uniformly spaced receptacle openings arranged in a circle around the edge thereof, said circle being concentric with said rotational axis of said annular member, and the angular displacement of said annular member being different than the angular displacement of said arm means.